United States Patent
Weiss et al.

(10) Patent No.: US 6,429,252 B1
(45) Date of Patent: *Aug. 6, 2002

(54) EMULSIFIERS FOR AMINO RESINS

(75) Inventors: Wolfram Weiss, Mutterstadt; Matthias Kummer, Weisenheim; Manfred Niessner, Schifferstadt; Hans Schupp, Worms, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,972

(22) PCT Filed: Mar. 18, 1998

(86) PCT No.: PCT/EP98/01554

§ 371 (c)(1),
(2), (4) Date: Oct. 4, 1999

(87) PCT Pub. No.: WO98/45370

PCT Pub. Date: Oct. 15, 1998

(30) Foreign Application Priority Data

Apr. 4, 1997 (DE) .............................. 197140/6

(51) Int. Cl.$^7$ ................................................ C08L 61/04
(52) U.S. Cl. ...................................................... 524/510
(58) Field of Search ................................. 524/500, 510

(56) References Cited

U.S. PATENT DOCUMENTS

| | | | | | |
|---|---|---|---|---|---|
| 4,156,665 A | * | 5/1979 | Eschwey | ...................... | 260/22 |
| 4,190,564 A | * | 2/1980 | Tominaga | .................... | 260/18 |
| 4,390,658 A | * | 6/1983 | Graetz | ........................ | 524/512 |
| 5,003,006 A | * | 3/1991 | Chu | ............................ | 525/92 |
| 5,126,393 A | * | 6/1992 | Blum | ......................... | 524/538 |
| 5,494,705 A | * | 2/1996 | Yamasoe | .................... | 427/327 |
| 5,759,696 A | * | 6/1998 | Alers | ......................... | 428/431 |

* cited by examiner

Primary Examiner—Paul R. Michl
(74) Attorney, Agent, or Firm—Oblon, Spivak, McClelland, Maier & Neustadt, P.C.

(57) ABSTRACT

A mixture comprises an amino resin and a polymer which consists to the extent of at least 80% by weight of $C_2$- to $C_3$ alkylene oxide groups.

3 Claims, No Drawings

EMULSIFIERS FOR AMINO RESINS

The invention relates to a mixture comprising an amino resin and a polymer which consists to the extent of at least 80% by weight of $C_2$- to $C_3$-alkylene oxide groups.

The invention also relates to amino resins comprising covalently bonded polymers as defined above. The invention relates in particular to aqueous dispersions of these mixtures with amino resins and to the use of the mixtures, amino resins, and/or their aqueous dispersions as curing agents in coating compositions.

Because of their reactivity, especially to hydroxyl, amino resins are used as curing agents for polymeric binders. In paint chemistry, hydrophobic, water-insoluble amino resins have been found particularly advantageous. In the case of aqueous coating compositions, the use of water-insoluble amino resins is of course more difficult. EP 733 686 discloses dispersing the amino resins with an anionic emulsifier.

The curing agent is added to the coating composition only by the paint manufacturer. In this case it is particularly important to the paint manufacturer that this curing agent can be used both in aqueous coating compositions and in coating compositions which are dissolved in organic solvents. In this context, irrespective of the chosen coating composition, a long shelf life, ready processability and good performance properties of the coatings subsequently obtained should be ensured. In the case of the aqueous amino resin dispersions of EP 733 686, their use in coating compositions based on organic solvents leads to disadvantageous properties, for example deficient water resistance of the resulting coatings.

U.S. Pat. No. 3,310,416 discloses water-insoluble amino resins comprising polyethylene glycols. These amino resins are used as dispersants, for example for hydrocarbons or polysiloxanes.

It is an object of the present invention to provide amino resins which are suitable as curing agents for aqueous coating compositions and for coating compositions based on organic solvents.

We have found that this object is achieved by the initially defined mixtures, amino resins and their aqueous dispersions.

The amino resin which is a constituent of the mixture comprises reaction products of aldehydes, for example glyoxal, furfurol and, preferably, formaldehyde, with amino compounds, such as urea or aminotriazine, for example benzoguanamine, acetoguanamine and, preferably, melamine.

Preference is given to amino resins based on aminotriazines. Reaction products of melamine and formaldehyde are particularly preferred.

In the course of the reaction of aldehyde, especially formaldehyde, the amino groups of the aminotriazines have been alkylolated, especially methylolated; in other words, the hydrogens of the amino groups are replaced by alkylol groups. Preferably more than 30%, in particular more than 50% of the hydrogens are replaced by alkylol groups. As a result, for example, of condensation reactions of the alkylol groups, the amino resins may contain a plurality of aminotriazine rings. Preferably they contain on average from 1 to 20 aminotriazine rings.

The remaining alkylol groups are preferably etherified, extensively or fully, with alcohols, preferably with $C_1$- to $C_{16}$-alkanols. These are preferably butanol or mixtures of butanol and methanol predominantly containing butanol.

The amino resins are preferably insoluble in water.

The dilution number of the amino resins is preferably less than 20 and, with particular preference, less than 5, in particular less than 2 or 1 g. The dilution number is a measure of how much hydrophilic solvent can be mixed with an amino resin without the resulting solution becoming cloudy.

The dilution number is determined by the following method:

1 g of amino resin is placed in a 25 ml test tube. Then 0.5 g portions of water are added at 23° C. After each portion has been added the tube is shaken and observed to see whether clouding or phase separation (incompatibility) remains after shaking. The amount of water, in g, added when incompatibility occurs is the dilution number.

For this purpose the polymer can be added, for example, to the amino resin solution as obtained in the preparation of the amino resin, in an organic solvent, generally the etherifying alcohol.

The resulting mixture can then be converted into an aqueous dispersion of the amino resin by adding water.

The polymer can also, for example, first be dissolved in water and the aqueous solution added to the amino resin.

The resulting aqueous dispersion of the amino resin can then be used as a curing agent in aqueous coating compositions.

In principle it is of course also possible to add the amino resin and the polymer, separately or together, directly to the aqueous coating composition and then to disperse the amino resin therein with the aid of the polymer.

Another embodiment of the invention comprises reacting the polymer with the water-insoluble amino resin; in other words, some of the alkylol groups of the amino resin are etherified with this polymer. This case is also subject to the above statements regarding the amino resin, the polymer and the proportions by weight of the two; in formulae I and II, one of the radicals $R^1$ and $R^2$ is replaced by the bond to the amino resin. The amino resin obtained by reaction with the polymer is still insoluble in water and has the above dilution number, but can be dispersed in water, as described above for the mixture, and is used accordingly as a curing agent in coating compositions.

Coating compositions comprise a polymeric binder with or without further additives such as pigments, dyes, leveling agents, thickeners, etc.

The polymeric binder, owing to its content of active hydrogens (OH, NH, SH groups), can be crosslinked with amino resins, i.e. is curable.

Examples of suitable binders are alkyd, polyester, epoxy and polyurethane resins, free-radical polymers based on acrylates, vinyl esters, dienes and vinylaromatic compounds or mixtures thereof.

In addition to the amino resin, the novel mixture comprises a polymer which consists to the extent of at least 80% by weight, preferably to the extent of at least 90% by weight, of $C_2$- to $C_3$-alkylene oxide groups. These groups can be exclusively ethylene oxide groups, propylene oxide groups, or ethylene oxide and propylene oxide groups.

The polymer preferably contains on average at least 10 and, with particular preference, at least 20 alkylene oxide groups. The maximum number of these groups is preferably 500, particularly preferably 300 and, with very particular preference, 200.

Preferred polymers are those of the formulae

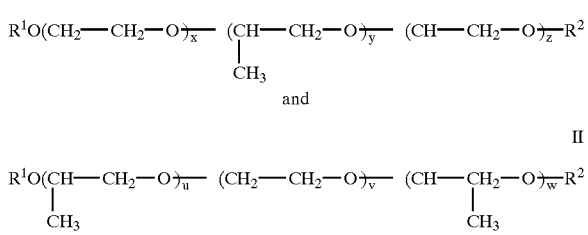

and where $R^1$ and $R^2$ independently are hydrogen, $C_1$- to $C_{20}$-alkyl or $C_1$- to $C_{20}$-acyl.

Preferably, $R^1$ and $R^2$ are hydrogen or $C_1$–$C_4$-alkyl, especially methyl or n-butyl.

The variables x, y, z are preferably at least 1. Preferably therefore, both formula I and formula II represent 3-block copolymers (EO-PO-EO in formula I and PO-EO-PO in formula II).

Polymers of this kind are known and are obtainable commercially from BASF, for example, under the designation Pluronic®.

The content of the polymer in the mixture is preferably from 0.1 to 50 parts by weight, particularly preferably from 0.5 to 10 parts by weight, based on 100 parts by weight of amino resin.

The polymer serves as an emulsifier, in other words a dispersant, for dispersing the water-insoluble amino resin in water.

Preference is given to free-radical addition polymers, condensation polymers or polyaddition polymers having OH groups, preferably with a hydroxyl number of from 20 to 200 mg of KOH/g of solid matter (in accordance with DIN 53240).

The binder and therefore the coating compositions as well can be present, for example, in the form of solutions in water or organic solvents or in the form of aqueous dispersions.

A significant advantage of the invention is that the novel mixtures and the novel amino resins modified with the polymers, or the aqueous dispersions of these mixtures and amino resins, can be used as curing agents both for aqueous coating compositions and for coating compositions in organic solvents, and in both cases give coatings having good performance properties, in particular good water resistance and adhesion.

The aqueous dispersions of the mixtures or of the polymer-modified amino resins are stable on storage. The coating compositions which comprise the mixtures or the polymer-modified amino resins are also stable on storage.

The novel coating compositions which comprise a polymeric binder and the novel curing agent can be applied to any desired substrates, for example of wood, metal, paper or plastic, by any desired methods, for example spreading, knife coating or spraying.

Following application, curing and removal of water and/or organic solvent take place in general by drying at elevated temperatures or by stoving.

EXAMPLES

A Polymers (Emulsifiers)

A1 Pluronic® PE 6400 (PO-EO block copolymer, molar mass of the poly-PO-block 1750, EO content 40% by weight).

A2 Pluronic® PE 6800 (PO-EO block copolymer, molar mass of the poly-PO-blocks 1750, EO content 80% by weight).

A3 Pluronic® PE 9400 (PO-EO block copolymer, molar mass of the poly-PO-blocks 2750, EO content 40% by weight).

A4 (Comparison) Emulphor® OPS 25 (ethoxylated sodium p-octylphenol sulfate, 25 mol of EO per mole of alkylphenol); 34% strength by weight solution in water B) Amino Resins B1 Luwipal® LR 8891 (butylated, partially alkylated melamine-formaldehyde resin in n-butanol, solids content 75%).

B2 Luwipal® LR 8817 (methylated, partially alkylated benzoguanamine-formaldehyde resin in isobutanol, solids content 80%).

B3 80 ml of butanol are distilled off at 50 mbar from 1000 g of Luwipal® LR 8891 with a solids content of 75%. The concentrate is then adjusted to a solids content of 72% with 115 ml of butylglycol.

B4 80 ml of butanol are distilled off at 50 mbar from 1000 g of Luwipal® LR 8891 with a solids content of 75%. 24 g of A3 (=2.3% by weight, based on A3 and B1) are then added and the concentrate is adjusted to an amino resin content of 72% with 115 ml of butylglycol.

B5 985 g of Luwipal® LR 8891 with a solids content of 75% by weight are admixed with 2.8 g of p-toluenesulfonic acid monohydrate and 7 g of A2. 190 ml of butanol are distilled off under reduced pressure at internal temperatures of 85° C.–95° C. Then the p-toluenesulfonic acid is neutralized with 105 mol-% of dimethylethanolamine, and 120 ml of butylglycol are added at 60° C. The result is an A2-modified amino resin having a solids content of 75%.

B6 2.3% by weight of A4 (solids) are dissolved in amino resin B1 (weight based on the sum of A4, solids, and B1)

USE EXAMPLES

C) Preparing Aqueous Melamine Resin Emulsions

Method I: Adding the Emulsifier to the Amino Resin 60 g of the amino resin solution, containing the emulsifier, are charged to a 150 ml polyethylene beaker, and the amount of water calculated to lead to an amino resin emulsion having a solids content of 45% is added dropwise over the course of 10 minutes while all the time stirring at from 500 to 1000 rpm with a laboratory stirrer fitted with dissolver disk. Stirring is subsequently continued for 30 minutes.

Method II: Adding the Emulsifier to Water 60 g of the amino resin solution are charged to a 150 ml polyethylene beaker, and the aqueous solution, containing the emulsifier, which is calculated to lead to an amino resin emulsion having a solids content of 45% is added dropwise over the course of 10 minutes while all the time stirring at from 500 to 1000 rpm with a laboratory stirrer fitted with dissolver disk. Stirring is subsequently continued for 30 minutes.

The following characteristics are measured for the fine emulsions which result (pH values with a glass electrode at 23° C., viscosities with a Brookfield viscometer, spindle 3, 10 rpm, 23° C.):

| Example | Method | Amino resin | Emulsifier | Amount of emulsifier (% by wt.) | pH value | Viscosity (Pas) |
|---|---|---|---|---|---|---|
| C1 | I | B4 | A3 | 2.3 | 4.8 | 2.8 |
| C2 | I | B5 | A2 | 0.7 | 5.5 | 1.25 |
| C3 | I | B6 | A4 | 2.3 | 6.1 | 0.35 |

-continued

| Example | Method | Amino resin | Emulsifier | Amount of emulsifier (% by wt.) | pH value | Viscosity (Pas) |
|---|---|---|---|---|---|---|
| (Comparison) | | | (Comparison) | | | |
| C4 | II | B1 | A1 | 1.4 | 5.6 | 1.9 |
| C5 | II | B2 | A2 | 0.7 | 8.0 | 0.45 |
| C6 | II | B3 | A3 | 0.7 | 5.6 | 2.0 |
| C7 | II | B1 | A4 | 0.7 | 6.6 | 0.9 |
| (Comparison) | | | (Comparison) | | | |

D) Aqueous Polyester Stoving Enamel

EXAMPLE D1

38 g of a 55% strength polyester resin solution (Bayhydrol® D155) in 16.5% butylglycol, 6.8% isobutanol, 18% water and 3.7% dimethylethanolamine, having a hydroxyl content (solvent-free) of 1.5% and an acid number (solvent-free) of 42 mg of KOH/g, are diluted with 42 g of water, and then 20 g of the melamine resin emulsion C1 are added with stirring. This gives a 30% strength aqueous polyester varnish having a viscosity at 23° C. of 3.2 Pas.

COMPARISON EXAMPLE D2

The procedure of D1 is repeated but using, instead of the melamine resin emulsion C1, the comparison emulsion C3: varnish viscosity at 23° C.: 2.0 Pas.

COMPARISON EXAMPLE D3

The procedure of D1 is repeated but using, instead of the melamine resin emulsion of Example C1, 11 g of an 80% strength aqueous solution of methanol-etherified, partially alkylated Luwipal® 073. This is therefore a water-soluble melamine resin without added emulsifier. Dilution with 25 g of water gives a 40% strength polyester varnish. Varnish viscosity at 23° C.: 4.2 Pas.

Condensation Water Testing:

The aqueous varnishes D1–D3 are applied with a 200 µm film-drawing frame to 200×90×0.75 mm deep-drawn metal panels, vented at room temperature for 10 minutes, dried first at 50° C. for 10 minutes and then stoved at 130° C. in a convection oven for 20 minutes. This gives transparent coatings having a film thickness of from 20 to 25 µm. After waiting for 24 hours, the test panels are stored with the coated side downward for 7 days over a water bath at 60° C. After a further 7 days of storage at 50% relative atmospheric humidity and 23° C., the following differences are observed.

The coating with the novel aqueous varnish D1 is unchanged, the comparison coating with the aqueous varnish D2 containing an ionic emulsifier has experienced subfilm corrosion over its entire area, and the comparison coating with the aqueous varnish D3 containing a methanol-etherified melamine resin shows cracking and delamination over the entire area, and furthermore the test panel has corroded.

E) Solvent Borne Acrylate Clearcoat

General Preparation Procedure:

50 g of an OH-containing polyacrylate (Luprenal® 240 S) having an OH number of 65 mg of KOH/g and a solids content of 60% by weight, and 20 g of amino resin (solids), and an amount of hydrocarbon (Solvesso® 100) sufficient to give a solids content of 50% by weight, are used to prepare, by stirring, a clearcoat.

| Acrylate clearcoat | Amino resin | Viscosity at 23° C. |
|---|---|---|
| E1 (Comparison) | B1 | 150 mPas |
| E2 | B4 | 155 mPas |
| E3 (Comparison) | B6 | 155 mPas |

Testing in a Gradient Oven

The solventborne clearcoat is applied with a 200 µm film-drawing frame to a 567×90×0.75 mm deep-drawn metal panel, vented for 10 minutes and stoved in a gradient oven, model 2612, from Byk, for 30 minutes over a temperature range from 90° C. to 190° C. After storage for 24 hours at 50% relative atmospheric humidity and 23° C., the following tests are carried out in succession in the individual temperature zones:

The flow is determined visually.

The water resistance of one side of the coated panel is tested by storing it for 60 minutes, standing on the long edge, in a water bath, submersed to a depth of about 3 cm, and then the minimum stoving temperature is determined which is necessary to obtain a nonabradable, finger-nail hard, optically unchanged coating.

The film thickness is determined using a Deltascope film-thickness meter from Fischer, Sindelfingen.

The pendulum attenuation is determined in accordance with DIN 53157 using a model 5840 instrument from Byk.

The crosshatch test is carried out in accordance with DIN 53151 using a crosshatching knife and Tesa film adhesive tape.

The Erichsen indentation is determined in accordance with DIN 53156 using a model 5313 instrument from Byk. Results:

| | E1 (Amino resin B1) | | | E2 (Amino resin B4) | | | E3 (Amino resin B6) | | |
|---|---|---|---|---|---|---|---|---|---|
| Flow | good | | | good | | | good | | |
| Water resistance from ° C. | 160 | | | 160 | | | >190 | | |
| Temperature zone (° C.) | 120 | 150 | 180 | 120 | 150 | 180 | 120 | 150 | 180 |
| Film thickness (µm) | 40 | 40 | 40 | 39 | 39 | 38 | 40 | 39 | 38 |

-continued

|  | E1 (Amino resin B1) | | | E2 (Amino resin B4) | | | E3 (Amino resin B6) | | |
|---|---|---|---|---|---|---|---|---|---|
| Pendulum attenuation (deflections) | 89 | 92 | 96 | 70 | 90 | 93 | 63 | 86 | 91 |
| Crosshatch (rating 0–5) | 4.5 | 5 | 4 | 4 | 4.5 | 3.5 | 4.5 | 5 | 3 |
| Erichsen indentation (mm) | 7.7 | 4.7 | 2.7 | 7.6 | 4.8 | 2.5 | 6.1 | 3.8 | 2.2 |

Discussion of the Results:

The amino resin B4, which contains the novel emulsifier, does not cause any impairment of the properties in solvent-borne coating materials. The amino resin B6, which contains an emulsifier according to EP 733 686, leads to a deterioration in the water resistance.

What is claimed is:

1. A process comprising (1) preparing a curing agent comprising an aqueous dispersion of a mixture comprising a water-insoluble amino resin and a polymer which comprises at least 80% by weight of $C_2$- to $C_3$-alkylene oxide groups, and (2) adding said curing agent to a coating composition; wherein said coating composition is an alkyd resin, a polyester resin, a polyurethane resin, a free-radical polymer based on an acrylate, a vinyl ester, a diene, and a vinylaromatic or a mixture thereof, wherein said polymer has formula (I):

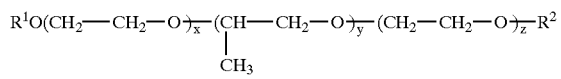

I wherein $R^1$ and $R^2$ independently are each hydrogen, $C_1$- to $C_{20}$-alkyl or $C_1$- to $C_{20}$-acyl and x, y and z are each 0 or an integer ranging up to 100 with the proviso that the sum of x+y+z is at least 10;

or a block copolymer of the formula (II):

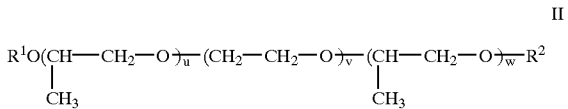

II wherein $R^1$ and $R^2$ are each as defined above, and u, v and w are each an integer ranging from 1 to 100 with the proviso that the sum of u+v+w is at least 10.

2. The process as claimed in claim 1, where the content of the polymer is from 0.1 to 50 parts by weight based on 100 parts by weight of amino resin.

3. The process as claimed in claim 1, where the polymer contains at least 10 alkylene oxide units.

\* \* \* \* \*

UNITED STATES PATENT AND TRADEMARK OFFICE
CERTIFICATE OF CORRECTION

PATENT NO. : 6,429,252 B1
DATED : August 6, 2002
INVENTOR(S) : Weiss et al.

It is certified that error appears in the above-identified patent and that said Letters Patent is hereby corrected as shown below:

<u>Title page,</u>
Item [30], Foreign Application Priority Data should read:

-- [30] Foreign Application Priority Data

Apr. 4, 1997  (DE) ........................19714016 --

Signed and Sealed this

Fourteenth Day of January, 2003

JAMES E. ROGAN
*Director of the United States Patent and Trademark Office*